Jan. 18, 1938.

A. A. EISENMAN

Re. 20,629

HOSE COUPLING

Original Filed June 9, 1932

Inventor
A. A. Eisenman
By Young & Young
Attorneys

Reissued Jan. 18, 1938

Re. 20,629

UNITED STATES PATENT OFFICE 20,629

HOSE COUPLING

Arthur A. Eisenman, Waukegan, Ill., assignor to Stewart-Warner Corporation, Chicago, Ill., a corporation of Virginia Original No. 1,924,712, dated August 29, 1933, Serial No. 616,244 June 9, 1932. Application for reissue April 22, 1935, Serial No. 17,594

10 Claims. (Cl. 285—84)

This invention pertains to hose couplings, and more particularly to a metallic coupling adapted to be pressed on to the end of a non-metallic, flexible, reinforced hose.

The invention has primarily for its object to provide an exceedingly simple, inexpensive and durable coupling, designed to receive the prepared end of a non-metallic, flexible, reinforced hose, and when clamped thereon to become embedded in the interstices of the reinforcing material, and in a portion of the hose covering.

Incidental to the foregoing, a more specific object of the invention resides in the provision of a metallic coupling utilizing an inner sleeve of comparatively soft, ductile material, adapted to be forced into interlocking engagement with the coupling and reinforcement, upon compression of the coupling on the hose.

A still further object resides in the method of attaching a coupling of the foregoing character to a non-metallic, flexible, reinforced hose, consisting in removing a portion of the hose covering to expose the reinforcement, inserting the exposed reinforced end into a ductile metal sleeve contained within the coupling, and thereafter compressing the coupling to cause the same to grip a portion of the covering and force the ductile sleeve to flow and embed itself into the inner face of the coupling and the interstices of the reinforcement.

With the above and other objects in view, which will appear as the description proceeds, the invention resides in the novel construction, combination and arrangement of parts, substantially as hereinafter described and more particularly defined by the appended claims, it being understood that such changes in the precise embodiment of the herein disclosed invention may be made as come within the scope of the claims.

In the accompanying drawing is illustrated one complete example of the physical embodiment of the present invention constructed according to the best mode so far devised for the practical application of the principles thereof.

Figure 1:
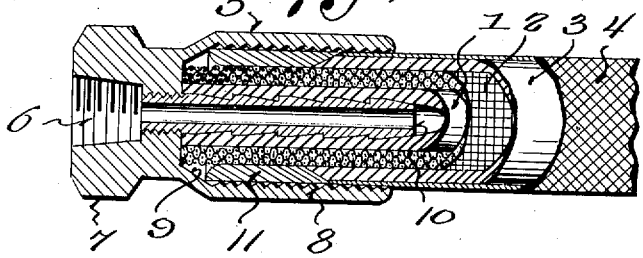
Figure 1 is a longitudinal section of the preferred form of the present invention, the several parts being arranged in juxtaposition prior to assembly.

Referring now more particularly to the accompanying drawing, the invention is illustrated in connection with a non-metallic, flexible, reinforced hose, comprising an inner core 1 formed from flexible rubber, or similar material, and surrounded by a metallic reinforcing layer 2, which, in the present instance, is formed from a wire mesh fabric wound over the core. Surrounding the reinforcing layer 2 is a covering 3, also formed from rubber, or similar material, and over the cover 3 is a fabric cover 4. The foregoing construction of hose is more or less conventional and therefore forms no specific part of the present invention, other than in the combination hereinafter claimed. It is also to be understood that the present invention, which resides essentially in the coupling, may be applied to other structures of hose, provided with metallic reinforcement, without departing from the invention.

In that form of the invention illustrated in Figure 1, the coupling proper comprises a sleeve 5 provided at its outer end with a threaded recess 6 for reception of a threaded pipe or nipple, to which the coupling is to be attached. The outer end of the shell may be hexagonally flattened or knurled at 7 for the reception of a suitable tool to facilitate its attachment. The inner face of the sleeve 5 may be mutilated in any suitable manner to provide a roughened surface. In that form illustrated, the same is provided with annular grooves or threads 8, while the inner end of the recess is provided with a tapered shoulder 9. The usual nipple or insert 10, provided with annular grooves, is threaded into the coupling centrally of its recess, the same being inserted into the central core 1 of the hose in the assembly of the coupling.

In the preferred form of the invention, a ductile ring or bushing 11 is inserted into the recess of the shell 5 and abuts the tapered shoulder 9 to space the ring from the inner end of the recess, in the manner illustrated in the drawing, the outer periphery of the ring 11 being of substantially the same diameter as the interior of the shell 5.

In order to assemble the hose and coupling, a portion of the rubber and fabric coverings 3 and 4, respectively, is cut away to expose the end of the reinforcement 2. The hose thus prepared is forced over the insert 10, as shown in Figure 1, and abutted against the inner end of the recess within the coupling shell, the extreme end extending beyond the inner end of the ductile ring 11. In this position the cut-away end of the covering is so gauged as to abut the outer end of the ductile ring, and while the abutting ends are shown as formed on a taper, the same may be straight without departing from the invention.

Figure 2:
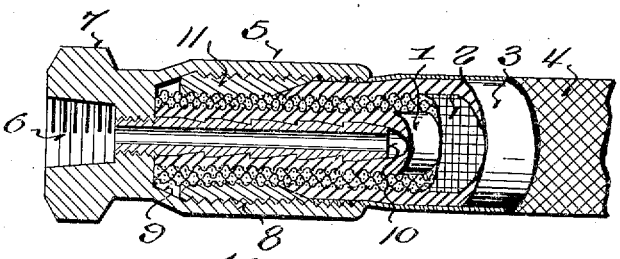
Figure 2 is a similar view illustrating the coupling attached.

After the hose and coupling are thus assembled, the coupling shell 5 is compressed within a suitable die or vise, causing the ductile material of the ring 11 to be forced and embedded in the interstices of the metallic reinforcement 2, and also into the grooves or mutilations formed on the inner face of the shell, as best disclosed in Figure 2. The foregoing compression of the shell, and consequently the ductile ring, will cause the inner end of the reinforcement, extending beyond the inner end of the ring 11, to flare slightly outwardly, inasmuch as that portion of the reinforcement engaged by the ring 11 is slightly depressed or compressed. At the same time, the outer end of the coupling shell 5 slightly compresses the covering 3 and securely grips the same because of the interior mutilations.

Thus, it will be readily seen that a coupling, constructed and assembled upon a hose in the foregoing manner, practically becomes an integral part of the hose, in that the ductile material becomes compactly forced into both the reinforcement of the hose and the mutilations or grooves within the shell. Therefore, an extremely rigid and durable coupling has been provided, in addition to securely sealing the same on the hose, inasmuch as the outer end of the shell also tightly compresses and clamps the covering. Furthermore, compression of the coupling causes the inner core to be clamped securely to the annularly grooved insert, thus making it practically impossible to remove the coupling without mutilation of the same.

Furthermore, inasmuch as the primary clamping action occurs between the coupling and the reinforcement of the hose, there is no mutilation of the flexible portion of the hose to cause rapid deterioration of the same. Consequently, a hose provided with a coupling of the foregoing character is capable of exceedingly long life.

Figure 3:
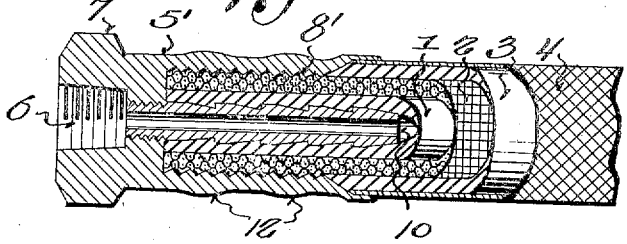
Figure 3 is a longitudinal section of a modification of the invention, illustrating the parts in assembled relation prior to attachment of the coupling.
Figure 4:
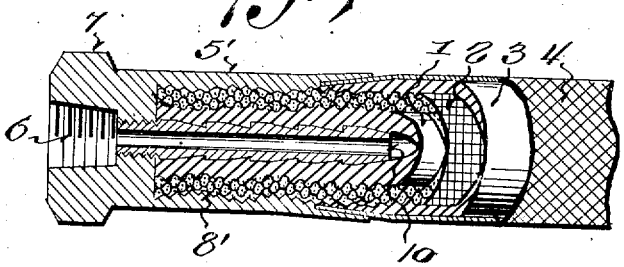
Figure 4 is a similar view of the modified coupling attached.

The modification of the present invention, illustrated in Figures 3 and 4, differs from the foregoing only in that the ductile ring 11 is eliminated. In this instance, the material of the shell itself is forced into the interstices in the reinforcement. Here the hose is prepared in the same manner as heretofore described, and, as shown in Figure 1, the interior of the recess, formed in the coupling shell 5', is normally straight and provided with mutilations or annular teeth 8'. The inner end of the hose abuts the end of the recess, while the outer end of the shell extends over the coverings 3 and 4. Normally the outer surface of the shell 5' is provided with a plurality of annular flutes, and after the several parts have been assembled, the coupling sleeve is then forced into a suitable die, which compresses the outer end of the shell and the projecting annular flutes 12, causing the inner surface of the recess to assume a general fluted contour, the flutes being forced into the interstices of the reinforcement, while the outer end of the shell clamps and compresses the outer coverings of the hose 3 and 4, respectively.

Obviously, the foregoing structure must be formed of relatively soft material in order to transpose the flutes from the exterior of the shell to the interior, as heretofore described, and, therefore, in instances where a metallic coupling of relatively hard material is desired, the ductile inner ring may be used in preference.

While the invention has been described in connection with the specific structures illustrated, it is to be understood that minor structural changes are contemplated within the scope of the appended claims.

I claim:—

1. In combination with a non-metallic, flexible, reinforced hose having the end of its cover cut away to expose a portion of the reinforcement, a coupling shell extending over the exposed reinforcement and a portion of the hose cover, and a ductile ring positioned in said shell over the exposed reinforcement, said shell being compressed upon the hose to clamp the cover and force said ductile ring into the interstices of said reinforcement.

2. In combination with a non-metallic, flexible, reinforced hose having the end of its cover cut away to expose a portion of the reinforcement, a coupling shell extending over the exposed reinforcement and a portion of the hose cover, and a ductile ring positioned in said shell over the exposed reinforcement, said shell having a roughened inner surface and being compressed upon the hose to clamp the cover and force said ring into its roughened surface and the interstices of said reinforcement.

3. In combination with a non-metallic, flexible, reinforced hose having the end of its cover cut away to expose a portion of the reinforcement, a coupling shell provided with a tapered shoulder at the inner end of its recess and extending over the exposed reinforcement and a portion of the hose cover, and a ductile ring positioned in said shell over the exposed reinforcement, said ring abutting said shoulder, and said shell being compressed upon the hose to clamp the cover and force said ductile ring into the interstices of said reinforcement.

4. In combination with a non-metallic, flexible, reinforced hose having the end of its cover cut away to expose a portion of the reinforcement, a coupling shell extending over the exposed reinforcement and a portion of the hose cover, said shell being provided with a closed end and a shoulder adjacent thereto, and a ductile ring positioned in said shell over the exposed reinforcement and engaging said shoulder, the opposite end of said ring abutting the end of said cover, said shell having a roughened inner surface and being compressed upon the hose to clamp the cover and force said ductile ring into its roughened surface and the interstices of said reinforcement.

5. In combination with a hose having a non-metallic inner layer and a reinforcing layer of metallic material having interstices, a metallic nipple inserted in said inner layer to prevent collapse thereof, and a metallic coupling body attached to said nipple and having tubular means extending over the exposed reinforcing portion, said tubular means including a ductile ring of material different from the material of said coupling body, said ring being in direct intimate contact with said reinforcing layer through a continuous length thereof, said tubular means being compressed upon the hose to clamp said reinforcing layer and said non-metallic inner layer against said nipple whereby a fluid-tight seal is effected between said nipple and said inner layer, and to force the metal of said ring into the interstices of said reinforcing layer to effect a mechanically strong connection between said body and said hose.

6. In combination with a hose having inner and outer layers of rubber and an intermediate reinforcing layer of material providing interstices, a metal nipple inserted in said inner layer to prevent collapse thereof, metallic coupling means attached to said nipple and having tubular means extending over an exposed portion of said reinforcing layer and over the adjacent end of said outer layer, said tubular means including a ductile ring in direct intimate contact with said reinforcing layer throughout a substantial continuous length thereof, said tubular means being compressed upon the hose to clamp said reinforcing layer and said inner layer against said nipple whereby a fluid-tight seal is effected between said nipple and said inner layer, and to force the metal of said ductile ring into the interstices of said reinforcing layer to effect a mechanically strong connection between said body and said hose.

7. In combination with a flexible, reinforced rubber hose having the end of its cover cut away to expose a portion of the reinforcement, said reinforcement being of metal, a coupling shell extending over the exposed reinforcement and a portion of the hose cover, and a ductile ring positioned in said shell over the exposed reinforcement, said shell being compressed upon the hose to clamp the cover and force said ductile ring into the interstices of said reinforcement.

8. In combination with a non-metallic flexible reinforced hose having the end of its cover cut away to expose a portion of the reinforcement, a coupling shell extending over the exposed reinforcement and a portion of the hose cover, a nipple extending into the bore of the hose to prevent collapse thereof, and a ductile ring positioned in said shell over the exposed reinforcement, said shell being compressed upon the hose to clamp the cover and force said ductile ring into the interstices of said reinforcement.

9. In combination with a non-metallic flexible reinforced hose having an inner layer of rubber and a cover, the end of the cover being cut away to expose a portion of the reinforcement, a coupling shell extending over the exposed reinforcement and a portion of the hose cover, a metallic nipple provided with annular grooves located in the bore of said hose, and a ductile ring positioned in said shell over the exposed reinforcement, said shell being compressed upon the hose to clamp the cover and force said ductile ring into the interstices of said reinforcement and to effect a fluid-tight seal between said nipple and said inner layer of rubber.

10. In combination with a non-metallic flexible reinforced hose having non-metallic layers on opposite sides of said reinforcement, the outer layer being cut away to expose a portion of the reinforcement, a coupling shell extending over the exposed reinforcement, a nipple located in said inner layer and rigid with said shell, and a ductile ring positioned in said shell over the exposed reinforcement, said shell being compressed upon the hose to force said ductile ring into the interstices of said reinforcement and to effect a seal between said nipple and said inner layer.

ARTHUR A. EISENMAN.